(12) United States Patent
Betin et al.

(10) Patent No.: US 6,859,472 B2
(45) Date of Patent: Feb. 22, 2005

(54) MULTI-JET IMPINGEMENT COOLED SLAB LASER PUMPHEAD AND METHOD

(75) Inventors: Alexander A. Betin, Manhattan Beach, CA (US); William S. Griffin, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 182 days.

(21) Appl. No.: 10/202,752

(22) Filed: Jul. 25, 2002

(65) Prior Publication Data

US 2004/0028094 A1 Feb. 12, 2004

Related U.S. Application Data

(60) Provisional application No. 60/350,630, filed on Nov. 13, 2001.

(51) Int. Cl.$^7$ .................................................. H01S 3/04
(52) U.S. Cl. ........................................................ 372/35
(58) Field of Search .............................. 372/33–36, 60, 372/70

(56) References Cited

U.S. PATENT DOCUMENTS

| | | | | |
|---|---|---|---|---|
| 4,752,936 A | * | 6/1988 | Gerhardt ..................... | 372/62 |
| 5,394,427 A | * | 2/1995 | McMinn et al. ............. | 372/70 |
| 5,471,491 A | * | 11/1995 | Phillips et al. ................ | 372/35 |
| 5,636,239 A | * | 6/1997 | Bruesselbach et al. ........ | 372/70 |
| 5,974,061 A | | 10/1999 | Byren et al. | |
| 6,014,391 A | | 1/2000 | Byren | |
| 6,055,260 A | | 4/2000 | Byren | |

FOREIGN PATENT DOCUMENTS

| | | |
|---|---|---|
| EP | 0 275 424 A | 7/1988 |
| EP | 0 743 725 A | 11/1996 |

OTHER PUBLICATIONS

Guyer, Handbook of Applied Thermal Design, McGraw Hill, New York, 1989, no month.
H. Martin, "Heat and Mass Transfer Between Impinging Gas Jets and Solid Surfaces," Advances i Heat Transfer, vol. 13, J. P. Hartnett and T. F. Irvine, Jr. (eds), Academic Press, New York, 1977, no month.

* cited by examiner

Primary Examiner—Don Wong
Assistant Examiner—Hung Tran Vy
(74) Attorney, Agent, or Firm—John E. Gunther; Leonard A. Alkov; William C. Schubert (57) ABSTRACT

A system for removing waste energy in the form of sensible heat and fluorescent energy from a solid state laser medium having a broad surface. The system includes a manifold disposed about the laser medium having a plurality of inlet jets interspersed with a plurality of exhaust orifices. Coolant fluid is circulated through the manifold. The fluid is forced through the plurality of inlet jets to impinge the broad face of the laser medium, thereby transferring waste energy by convection from the laser medium to the coolant fluid. The coolant fluid is further circulated to exhaust the pumphead manifold through the plurality of exhaust orifices. The fluorescent energy, which is radiated from the laser medium, is converted to sensible heat by an absorber disposed within the coolant adjacent to the laser medium. The coolant then removes the converted heat by forced convection. The absorber can be suspended particles in the coolant fluid or a porous material supported in the manifold at some distance from the laser medium.

38 Claims, 8 Drawing Sheets

SECTION A-A

Fig. 5

SECTION B-B

Fig. 6

SECTION C-C

MULTI-JET IMPINGEMENT COOLED SLAB LASER PUMPHEAD AND METHOD

CROSS-REFERENCE TO RELATED APPLICATIONS

This application claims priority from U.S. Provisional Application No. 60/350,630, filed Nov. 13, 2001 by Alexander A. Betin et al, entitled. MULTI-JET IMPINGEMENT COOLED SLABS LASER PUMPHEAD AND METHOD.

BACKGROUND OF THE INVENTION

1. Field of the Invention

The present invention relates lasers. More specifically, the present invention relates to a system and method for cooling a high-power solid state laser.

2. Description of the Related Art

Solid state laser technology has advanced to the point where thermal management of high-energy lasers in operation is a limiting factor in scaling such systems to greater power levels. This is particularly true where high-energy laser system design parameters are constrained to limited size and weight. Thermal management technology advancement is therefore a key factor in increasing power output levels in high-energy solid state lasers.

Current solid-state laser designs employ a doped-insulator lasing medium driven by high power light emitting diode array pumplights. The lasing material is typically comprised of a host crystal doped with an ion, such as for example, ytterbium doped yttrium aluminum garnet (Yb:YAG). Rod shaped lasing media have been used, but are power limited due to the limited surface area they present for coupling pumplight into the medium and for removal of waste heat energy. High aspect ratio slabs are now employed to overcome some of the limitations present in rod type lasers. Lasing slabs are formed in high aspect ratio configurations that define two ends, two long and narrow edges, and two broad side surfaces.

Modern slab lasers are optically pumped by narrow spectral band, high brightness laser diode arrays. The higher brightness levels of such laser diode pump sources allows the high aspect ratio slab to be pumped either through the narrow edges of the slab, in directions generally transverse to the laser beam, or, through the narrow ends of the slab, in directions generally co-linear with the laser beam. Edge and end pumping of the slab allows the broad side faces to be cooled without constraining the cooling system to also transmit the pumplight beam into the slab, thereby generally simplifying the cooling system design by not requiring the coolant to transmit the pumplight beam. Laser efficiency is also improved with a pumping configuration that results in the optimum absorption and distribution of pump energy in the lasing medium.

In operation, pumplight energy is coupled into the laser slab and serves to excite ions in the lasing medium, which change energy states to produce the laser beam energy. Like all energy conversion processes, the efficiency of the lasing process can not achieve 100%. Energy that is not converted into laser beam energy is waste energy that results in the production of sensible heat energy and fluorescence light energy. The sensible heat energy must be conducted to the surfaces of the slab for removal while the fluorescence energy may be transmitted through the slab surfaces as radiated light energy. Both forms of waste energy must be removed from the system. Failure to remove the waste energy produces several deleterious effects that ultimately limit the maximum laser beam quality and the energy capability of the system.

Generally, an increase in operating temperature within the lasing medium reduces the efficiency of the lasing process. Conversely, reducing the operating temperature of the laser increases the gain and extraction efficiency. More specifically, reducing the operating temperature increases the stimulated emission cross-section of the active lasing medium. Similarly, this also lowers the saturation intensity, which makes it easier to extract power from continuous and high pulse rate systems without damage to the optical components in the system. Thus it is clear that high-energy laser systems benefit from effective thermal management. There have been various approaches to waste energy removal in the prior art.

Generally, heat and energy removal implies a flow of energy from within the lasing medium slab outward. The flow of sensible energy creates a temperature gradient within the slab. The temperature gradient causes mechanical stress within the slab. When the medium is stressed the crystal becomes birefringent. Birefringence causes energy in the laser beam, if polarized in a direction that is neither along nor orthogonal to the stress gradient, to become depolarized from the desired beam polarization. Such induced birefringence is therefore undesirable, particularly in high-energy applications. A typical multipass master oscillator power amplifier laser system uses a polarizer and 90 degree polarization rotation device to separate the master oscillator input beam from the amplified output beam. If beam polarization is compromised, because of thermal stress induced birefringence, a portion of the output beam is fed back into the master oscillator. Such feedback is potentially damaging to the oscillator components. Depolarization also reduces the output power and imprints a non-uniform intensity profile on the output beam, which adversely affects beam quality. It is therefore desirable to maintain a one-dimensional temperature gradient within the slab and orient the polarization of the beam to be co-linear with or orthogonal to this gradient in order to avoid depolarization due to thermal stress birefringence.

In side-pumped slab laser configurations, heat is removed from the lasing medium by cooling mechanisms applied to the broad side faces of the slab. Prior art methods for cooling the broad slab faces include air cooling, liquid cooling systems, and conductive cooling through metal heat sinks. Similar approaches have been applied to cool high power Yb:YAG laser rods, employing small jets that impinge liquid coolant directly on the surface of the rod, thereby improving the heat transfer properties. See for example; Phillips, et al, U.S. Pat. No. 5,471,491 and Bruesselbach, et al, U.S. Pat. No. 5,636,239. Cooling hot slabs of glass with multi-jet impingement is known in area of art concerning tempered glass. Multi-jet impingement cooling creates a variety of coolant flow issues that are not easily resolved when taken in combination with the need to control the thermal gradients in the slab. Further, the prior art teachings do not address the issue of the removal of the fluorescence energy required in application with solid state diode-pumped laser.

Thus, there is a need in the art for a system and method to remove waste energy from slab lasers that avoids the disadvantages of the prior art, while maintaining compact size, high efficiency, and low distortion of the laser beam.

SUMMARY OF THE INVENTION

The need in the art is addressed by the systems and methods of the present invention. A system for removing waste energy from a solid state laser medium that has a broad surface is taught. The system includes a manifold disposed about the laser medium. The manifold has plural inlet jets formed therein. A coolant fluid is circulated through the plurality of inlet jets to impinge on the broad face of the laser medium, thereby transferring waste energy by convection from the laser medium to the coolant fluid.

In the illustrative embodiment, the coolant fluid is further circulated to return out of the manifold via the plurality of exhaust orifices. The system also includes a heat exchanger coupled into the coolant fluid circulation path for removing the waste energy from the coolant fluid. The coolant fluid is circulated continuously in one embodiment. The laser medium may be formed as a slab having at lease one edge. In such an embodiment, pumplight enters along the edge, and the broad surface defines at least one side of the slab. The laser medium may be formed with a high aspect ratio defining the broad surface. The laser medium may be formed with a disk geometry defining the broad surface. The laser medium may be formed with a substantially rectangular shape defining the broad surface. The laser medium may be formed with a tapered shape defining the broad surface. In a refinement of the invention, laser pumplight enters the laser medium along a surface other than the broad surface and the waste energy is removed from the broad surface. The laser medium may be fabricated from Ytterbium doped laser host or Neodymium doped laser host or any other solid state laser active medium as may be known to or discovered by those skilled in the art. In another refinement, the broad surface is substantially planar. In an illustrative embodiment, the waste energy is sensible heat produced in the laser medium.

In another refinement, the waste energy is fluorescent energy radiated from the laser medium and the system further includes an absorber disposed within the manifold at a location to intercept the fluorescent energy. The system operates to convert the radiated fluorescent energy to sensible heat. The coolant fluid circulates about the absorber to remove the converted sensible heat from the absorber by forced convection. In a refinement, the absorber is an in-band absorber with respect to the lasing wavelength. The absorber may be bulk particulate matter or a soluble dye dispersed in the coolant. In another embodiment, the absorber is positioned as a layer between the plural exhaust orifices and the laser medium, and is selected from one of; a porous material, a sintered metal, a metallic foam, a fibrous material, beads, a woven material, or a mesh. The absorber may include plural layers of material. In another refinement, the absorber is positioned at a finite distance from the broad surface and the fluorescent energy is transmitted through the coolant to the absorber. The coolant fluid may be circulated by a pump. The coolant fluid may be ammonia, water, ethanol, methanol, water/ethylene glycol mixture, water/alcohol mixture, cryogens such as liquid CO2, LN2 or liquid argon suitable for transferring heat.

In another illustrative embodiment, the manifold has a plurality of exhaust vents formed therein such that plural portions of the plurality exhaust orifices couple the coolant fluid to each of the plurality of exhaust vents prior to the coolant fluid returning to the means for circulating. In a refinement to this embodiment, the flow axis of the plural of exhaust orifices and the plural exhaust vents are aligned along substantially different directions. In a particular embodiment, the different directions are orthogonal to one another. To effect a manifold design that is easier to manufacture, the plural exhaust orifices have a first end opening and a second end opening, and the first end opening is positioned to receive the coolant near the broad surface of the laser medium. The second end opening is sealed from the flow of coolant fluid and the plural orifices have a third opening that is coupled to one of the plural exhaust vents. The second end opening may be sealed with an 'O'-ring.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The illustrative embodiment of the present invention is applied to a continuous operation 100 kW-class Yb:YAG phase conjugate master oscillator/power amplifier ("PC MOPA") laser. The illustrative embodiment laser design employs a 6 mm by 58 mm by 300 mm slab amplifier that produces approximately 60 W/cm$^2$ of sensible heat and 230

W/cm² of fluorescence light waste energy during operation. The illustrative embodiment multi-jet impingement cooling system provides an effective means of removing the sensible heat produced by the laser at the surface of the slab, while allowing the fluorescence energy (radiated light) to transmit through the slab and away from the film region near the surface, thereby not exacerbating the thermal load at the critical surface. All-liquid operation avoids the problems associated with nucleate boiling, which include slab vibration, scattering of the fluorescence energy from the bubbles, and poor bulk absorption of the fluorescence energy within an absorptive cooling medium.

The illustrative embodiment of the present invention uses an all liquid-phase multi-jet impingement approach to slab cooling. Coolant fluid is impinged directly on the broad face of the slab to remove the sensible heat component. Further, the illustrative embodiment also employs an absorbing material disposed in the coolant fluid to absorb the fluorescence component in a distributed volume at some distance away from the slab face. As such, fluorescence heating does not occur and does not add to the sensible heat at the slab face. This approach provides excellent thermal transfer at the surface, avoids the aforementioned problems associated with nucleate boiling in an otherwise single-phase cooling system and is compatible with a continuously operating high-energy laser device.

The present invention enables designers to effectively scale solid-state lasers to high power. As noted herein before, it is desirable to fabricate the laser gain medium in a high-aspect-ratio slab or disk geometry. The slab geometry offers the following important advantages. The heat flow is confined to one direction across the thin dimension of the slab, thereby minimizing the temperature in the center of the slab. This is particularly important for quasi-four level lasers such as ytterbium lasers. The thermal lensing and thermally-induced stress are also oriented in one direction, simplifying the optical aberration and birefringence compensation. Diffusion bonding of laser crystals can be used to increase the physical size of the laser medium beyond the growth limits of individual laser crystals. Optical cladding layers can also be diffusion bonded to the laser slab to optically guide the laser beam and/or pump beams and to enhance the fracture strength of the bulk media. In edge- and end-pumped schemes, the broad side faces of the slab are not used for either injecting the pump light or extracting the laser beam and can therefore be dedicated to continuous energy extraction, providing an enhanced forced convection heat transfer surface area, without deleterious affects on optical performance.

Figure 1:
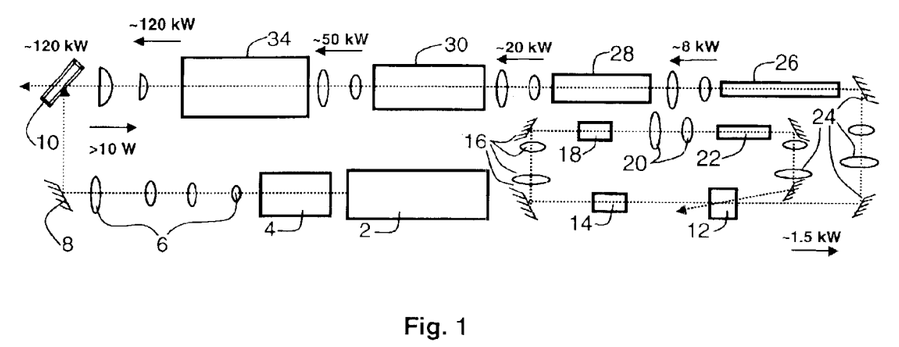
FIG. 1 is a functional block diagram of a multi-pass master-oscillator power amplifier slab laser according to an illustrative embodiment of the present invention.

Reference is directed to FIG. 1, which is a functional block diagram of a multi-pass master-oscillator power amplifier solid-state slab laser according to an illustrative embodiment of the present invention. The illustrative embodiments is a 100 kW Yb:YAG phase conjugate master oscillator power amplifier ("PC MOPA") laser system. Those skilled in the art will recognize the components represented in FIG. 1. Basically, the illustrative embodiment laser includes a master oscillator 2 that outputs a low power beam (in the 100 watt to 1000 watt power range) to a Faraday Isolator 4. The beam passes through a several optical elements 6 that provide spatial filtering and beam shaping functions. A mirror 8 directs the beam to beam splitter 10. The power into the system at this point is approximately 10 watts. At the other end of the multi-pass system is a loop comprised of several elements. These include several optical lenses and mirror element, 16, 20 and 24, which circulate the beam about the loop. The functional elements within the loop include a thermal nonlinearity cell 12, a Faraday attenuator 14, and a pair of amplifiers 18 and 22. The energy output from the loop is approximately 1.5 kW, which is fed to an amplifier beamline at the first power amplifier stage 26. The power output from the first power amplifier stage 26 is approximately 8 kW, which is coupled to a second power amplifier stage 28. The power output from the second power amplifier stage 28 is approximately 20 kW, which is coupled to a third power amplifier stage 30. The power output from the third power amplifier stage 30 is approximately 50 kW, which is coupled to a fourth power amplifier stage 34. The power output from the fourth power amplifier stage is approximately 120 kW. In illustrative embodiment, the high power amplifier stages are solid state laser amplifier pumpheads.

The largest of the four pumpheads, power amplifier 34, in the amplifier beamline generates 21 kW of sensible heat, of which half is extracted from each of the 58 mm×300 mm slab faces, for a total heat flux of 60.3 W/cm² per surface. In addition, 230 W/cm² of radiated fluorescence power is also be extracted from each side of the slab.

Figure 2:
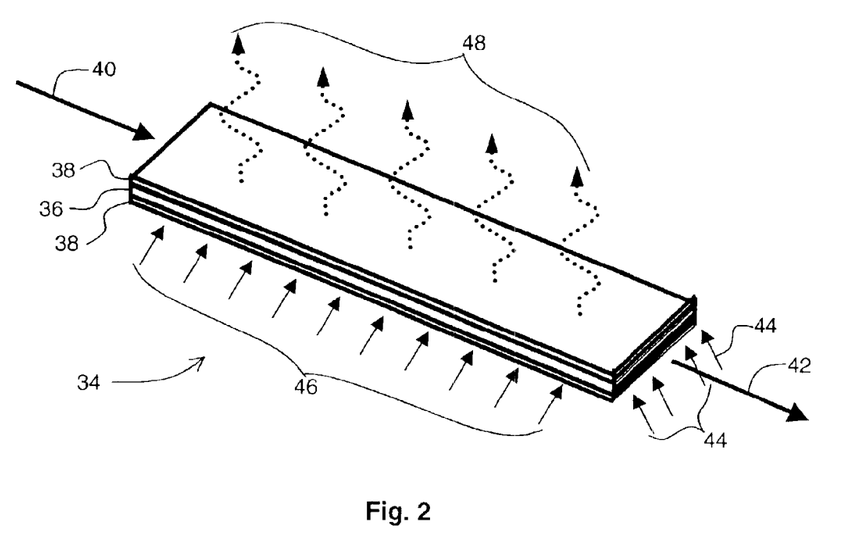
FIG. 2 is a perspective drawing of a slab laser amplifier medium according to an illustrative embodiment of the present invention.

Reference is directed to FIG. 2, which is a perspective drawing of a slab laser amplifier medium 34 according to an illustrative embodiment of the present invention.

The solid state slab 34 is diffusion-bonded ytterbium doped yttrium, which forms the core 36 of the slab 34. Cladding layers 38 may be applied to strengthen the slab and to control refraction. An input beam 40 passes through the slab 34, is amplified and is then output as a beam 42 of greater power. Either of the ends of the slab 34 can be fed with pumplight 44, or either of the edges of the slab 34 can be fed with pumplight 46. Waste energy 48 emanates from both of the broad sides of the slab 34 in the form of sensible heat energy and fluorescent radiated light energy.

Figure 3:
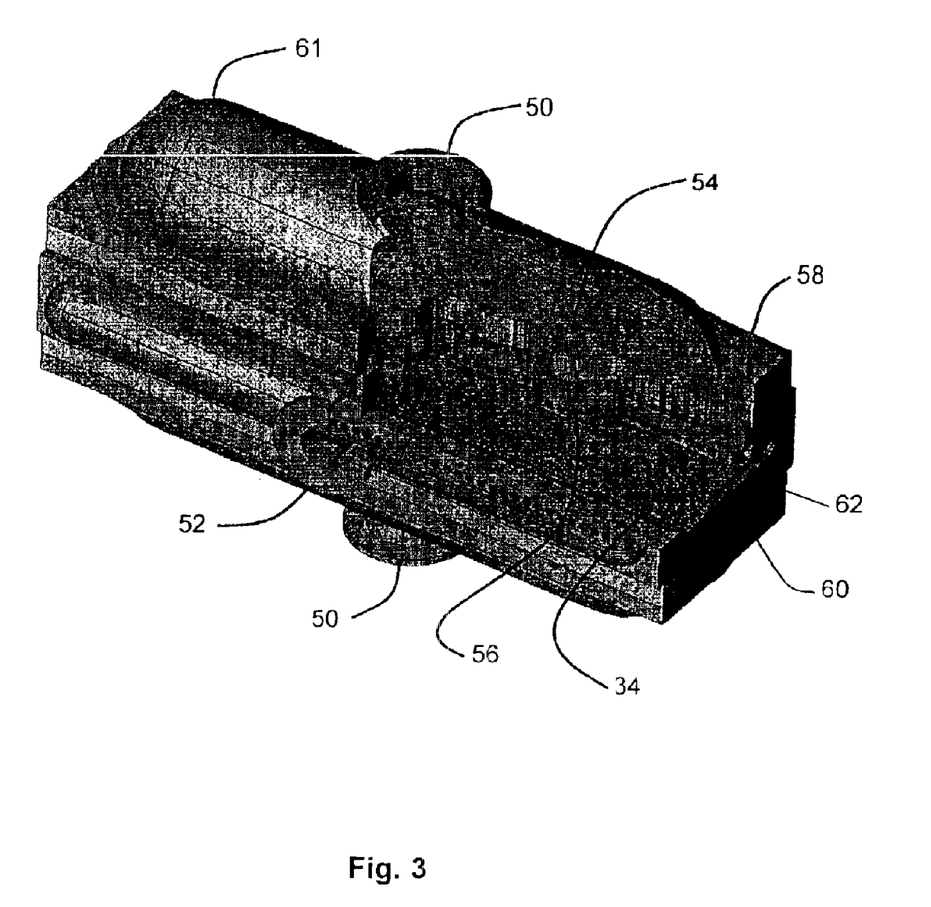
FIG. 3 is a cut away perspective drawing of a multi-jet impingement-cooled slab laser pumphead according to an illustrative embodiment of the present invention.

FIG. 3 illustrates a cut away perspective view of the multi-jet impingement-cooled slab laser pumphead according to an illustrative embodiment of the present invention. The aforementioned laser slab 34 is located within a pumphead manifold comprising several components. The pumphead manifold serves to house the slab 34 and to direct the flow of coolant fluid to and from the slab 34. Coolant fluid enters the two inlets 50 in the manifold housing 61. An inlet manifold 62 routes the flow of coolant fluid through plurality of inlet holes 54, which couple to a plurality of inlet jets (not shown) located in a coolant manifold 60. The coolant fluid exits the plural coolant jets and impinges upon the slab 34. Interspersed among the plural inlet jets are plural exhaust orifices (not shown) also located within the coolant manifold 60. The plural exhaust orifices couple to plural exhaust vents 56, which route the coolant fluid to the sides of the pumphead manifold, where the fluid exits via outlets 52 located on both sides of the pumphead manifold. Details of the inlet jets, exhaust orifices, and exhaust vents will be more fully developed hereinafter.

The impingement of the coolant fluid against the slab causes transfer of the sensible waste heat from the slab to the coolant by forced convection. The regular and geometric arrangement of the plural inlet jets and exhaust orifices assures even energy transfer and cooling of the slab. The coolant fluid is ammonia in the illustrative embodiment, however those skilled in the art will be familiar with a variety of suitable coolant fluids applicable in the present invention, such as water, ethanol, methanol, water/ethylene glycol mixture, water/alcohol mixture, cryogens like liquid $CO_2$, $LN_2$ and liquid argon. The transfer of the waste fluorescent energy to the coolant fluid is managed by other mechanisms in the present invention.

In a particular embodiment of the present invention, the fluorescence component of waste energy from the slab is absorbed within a species dissolved or suspended within the coolant fluid. This allows the conversion of fluorescent energy from light to heat to occur within a distributed region within the coolant manifold, that is located away from the surface of the slab. In another embodiment, the fluorescence is absorbed at the surface of a porous structure disposed within the coolant manifold, such that the exhaust coolant flows through the structure, thereby removing the waste energy as sensible heat.

Figure 4:
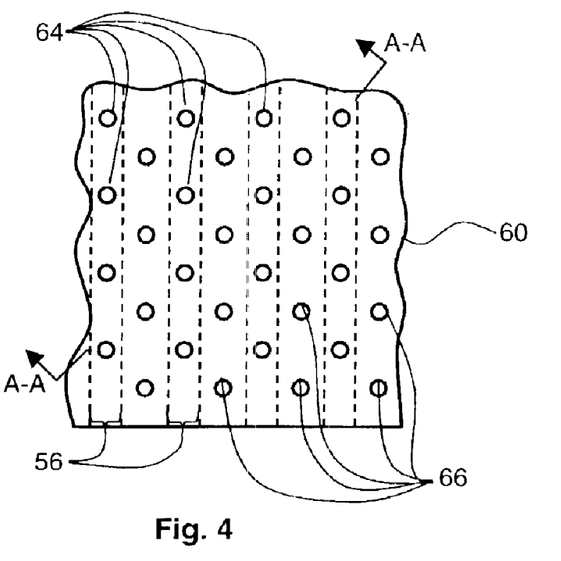
FIG. 4 is a partial section of the coolant manifold showing the arrangement of impingement jets and exhaust openings according to an illustrative embodiment of the present invention.

Reference is directed to FIG. 4, which is a partial section of the coolant manifold showing the arrangement of inlet jets and exhaust openings according to an illustrative embodiment of the present invention. The view in FIG. 4 is a view as reflected from the surface of the slab. This approach is used so as to align the jets and orifices with the subsequent section views discussed hereinafter. Plural inlet jets 66 are interspersed with plural exhaust orifices 64 on the surface of the coolant manifold 60. A geometric pattern is employed such that every other opening along the diagonals are alternating inlet jets and exhaust orifices. Such a diagonal is shown as 'A—A'. In this way, each inlet jet 66 is surrounded by exhaust orifices 64, and vice versa. This provides an organized flow of coolant out of each jet 66, with impingement upon the slab and then return out the adjacent exhaust orifices 64. The aforementioned exhaust vents 56 are shown in phantom in FIG. 4, and are aligned so that each column of exhaust orifices 64 coupled to a single exhaust vent 56. The utility and advantage of this arrangement will be more fully discussed hereinafter.

Figure 5:
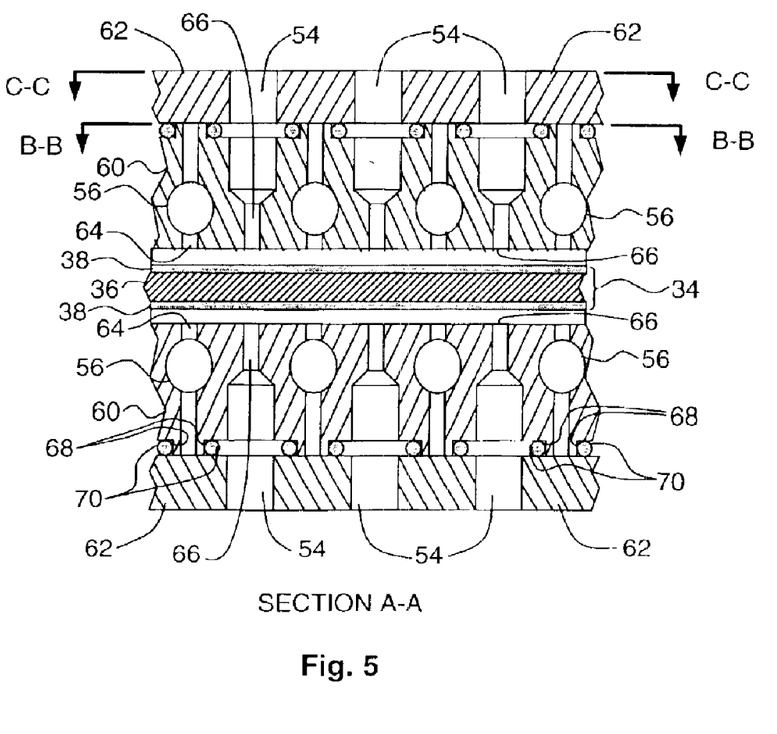
FIG. 5 is a cross-section view of the inlet manifold, coolant manifold and laser slab according to an illustrative embodiment of the present invention.

Reference is directed to FIG. 5, which is a cross-section view of the inlet manifold, coolant manifold and laser slab according to an illustrative embodiment of the present invention. The cross-section in FIG. 5 is taken along section line 'A—A' from FIG. 4. A diagonal section is employed because this view reveals the relationship between the coolant inlet and exhaust routing through the coolant manifold 60 and the inlet manifold 62. In the illustrative embodiment, the laser slab 34 is cooled on both of its upper and lower broad surfaces, hence FIG. 5 shows a set of coolant manifolds 60 and inlet manifolds 62 both above and below the slab 34. Each inlet manifold 62 has plural inlet openings 54 that are aligned with respective inlet jets 66 that are located in the coolant manifold 60. Coolant that is forced into the pumphead manifold naturally flows into the plural inlet openings 54. The coolant flows into the coolant manifold 60 where the inlet opening 54 is constricted to the inlet jet 66 diameter, which causes acceleration of the coolant to a higher velocity. The coolant impinges against the slab 34 and then returns into the coolant manifold 60 through the plural adjacent exhaust orifices 64. The exhaust orifices 64 are holes formed in the coolant manifold 60 that intersect plural coolant vents 56, which are drilled in a direction orthogonal to the exhaust orifices 64. The outer end of the exhaust orifice holes 64 are capped by the inlet manifold 62, which does not have holes aligned with the exhaust orifices 64. A tight seal is achieved by compressing an 'O'-ring 70 between the coolant manifold 60 and the inlet manifold 62 around each of the outer exhaust orifice 64 openings in the coolant manifold 60, which has an extension 68. Thus, the coolant fluid that exhausts the manifold 60 is forced through the exhaust vents 56 in order to exit the pumphead manifold. In the illustrative embodiment, a circulating pump is employed to force the flow of the coolant fluid. A heat exchanger is employed to remove the waste energy from the coolant fluid before it is returned to the inlet side of the pumphead manifold.

Figure 6:
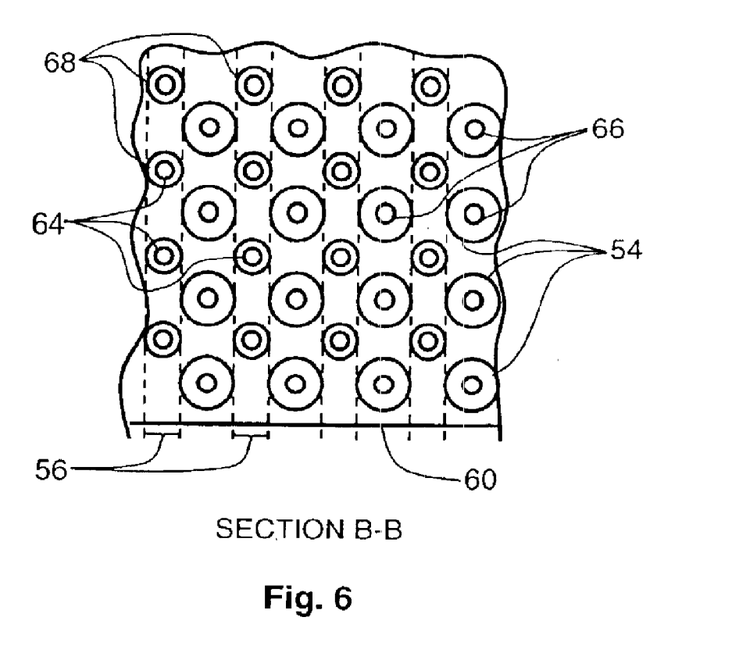
FIG. 6 is a partial section view of the coolant manifold showing the arrangement of inlet and exhaust openings, according to an illustrative embodiment of the present invention.

Details of the construction of the coolant manifold 60 are visible in FIG. 6, which is a partial section view of the coolant manifold 60 showing the arrangement of inlet and exhaust openings, taken along section line 'B—B' from FIG. 5. In FIG. 6, the coolant manifold 60 has plural inlet openings 54, which have a relative large diameter compared to the inlet jets 66 which are located below. Interspersed with the inlet openings are plural exhaust orifices 64. The coolant manifold 60 has an extension 68 around each exhaust orifice. This extension 68 serves to locate and support the 'O'-ring 70, (not shown). Also visible in FIG. 6 are the exhaust vents 56.

Figure 7:
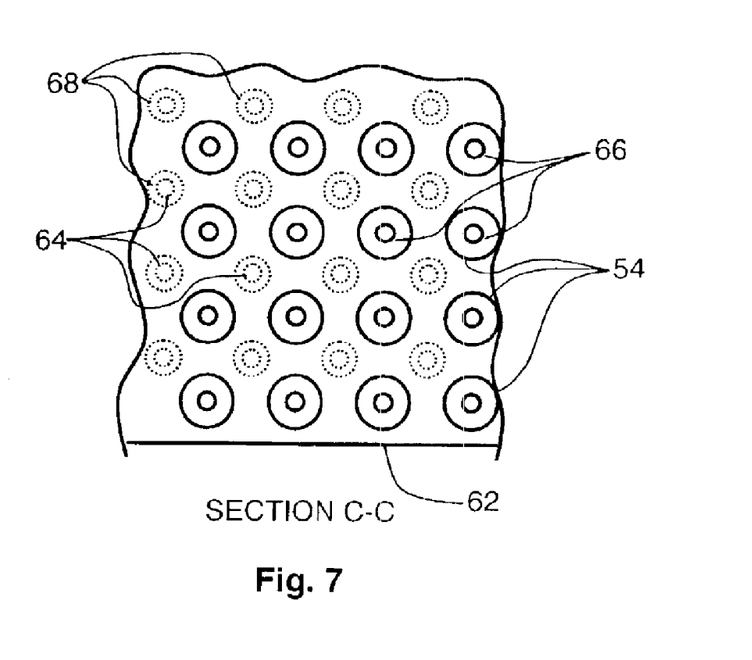
FIG. 7 is a partial section of the inlet manifold showing the arrangement of coolant inlet openings according to an illustrative embodiment of the present invention.

Details of the construction of the inlet manifold 62 are visible in FIG. 7, which is a partial section view of the inlet manifold 62 showing the arrangement of inlet and exhaust openings, taken along section line 'C—C' from FIG. 5. In FIG. 7, the plural inlet openings 54 are visible in the inlet manifold 62. Also visible are the plural inlet jets 66 below. The exhaust orifices 64 and the extension 68 are shown in phantom, as they appear below.

The aspects of the illustrative embodiment discussed with respect to FIGS. 4, 5, 6, and 7 teach the use of the cooling fluid to absorb sensible heat at the surface of the slab by use of forced convection. And, the absorption of the escaped fluorescence by bulk absorption material suspended in the coolant fluid itself. This approach requires the addition of an in-band absorber suspended in the cooling fluid. Depending on the choice of cooling fluid, it may be difficult to obtain a satisfactory bulk absorber, which has other desirable properties such as not depositing out on the slab surface or forming particulate clumps. An alternative illustrative embodiment uses another approach to deal with the fluorescent energy. This approach is illustrated in FIG. 8.

Figure 8:
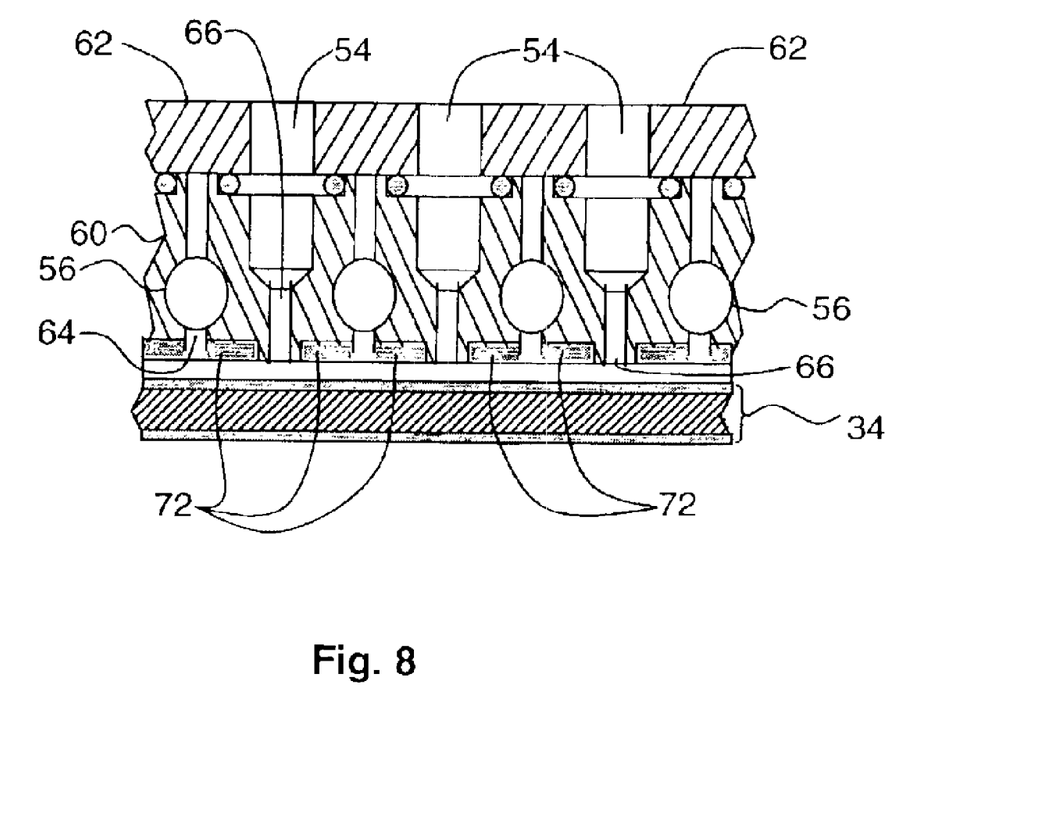
FIG. 8 is a cross-section view of the inlet manifold, coolant manifold and laser slab according to an illustrative embodiment of the present invention.

FIG. 8 is a cross-section view of the inlet manifold, coolant manifold and laser slab according to an illustrative embodiment of the present invention. FIG. 8 is a section view taken along Section lines 'A—A' in FIG. 4. The structure in FIG. 8 is the same as that illustrated in FIG. 5 with respect to the inlet manifold 62, the inlet openings 54, the inlet jets 66, the slab 34, the coolant manifold 60 generally, the exhaust orifices 64 and the exhaust vents 56. Where the embodiment in FIG. 8 differs is the presence of a recess in the face of the coolant manifold about each exhaust orifice 64 and the placement of a porous absorber layer 72 therein. This facilitates the alternative method of capturing the escaping fluorescence. Instead of having an absorber in the cooling fluid, the porous layer 72 is placed in front of the exhaust orifices 64. Holes are made in the absorber layer 72 so that the supply jets may pass through the layer unimpeded. However, the coolant fluid must pass through the absorber layer on its way to the exhaust orifices 64. Energy from the escaped fluorescence is captured in the fibers of the porous layer 72 by means of multiple bounces and eventual absorption on the fiber surfaces. This captured energy, now in the form of sensible heat, is transferred by convection to the coolant fluid as it passes through the porous layer. Due to the very small diameters typical of the fibers and/or beads used to constitute the porous absorber layer 72, total heat transfer area is quite large, and resultant heat transfer conduction lengths are very small. Both will work to make the total temperature difference between the absorber layer and the cooling fluid small, on the order of a few degrees Celsius. By using this approach, it is possible to capture the escaped fluorescence energy in hardware separate from the slab and without the use of additional materials added to the coolant fluid. A pure coolant fluid, such as ammonia, can therefore be used which may provide longer mean time between preventative maintenance. This desirable feature is obtained while still relieving the slab of the requirement of very heat fluxes at its outer surface. In the illustrative embodiment, multiple layers of screen wire diffusion bonded together are used. However, other alternative absorbers may be used such as a sintered powder metal or a metallic foam.

Figure 9:
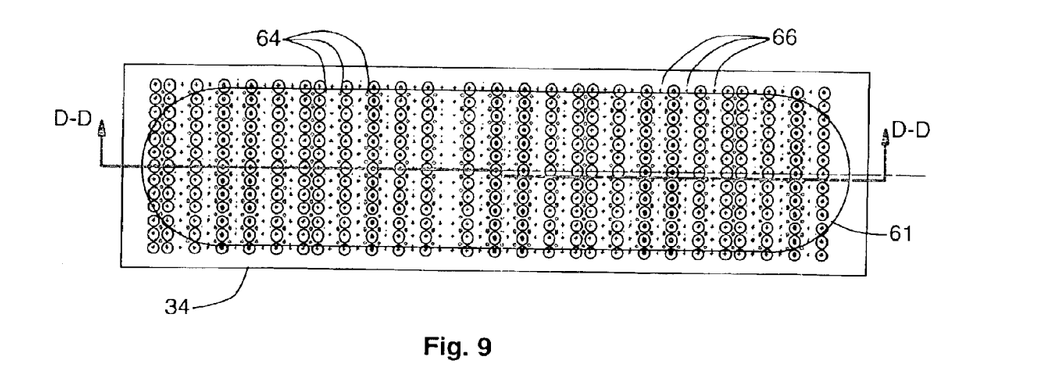
FIG. 9 is a drawing of the impingement-jets and exhaust openings aligned with the laser slab according to an illustrative embodiment of the present invention.
Figure 10:
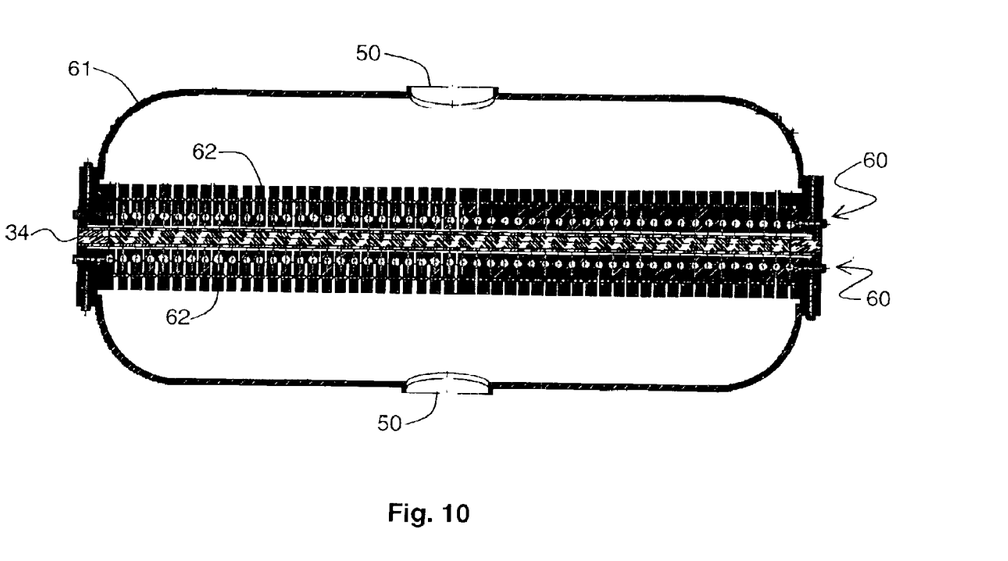
FIG. 10 is a cross-section of a multi-jet impingement-cooled slab laser pumphead according to an illustrative embodiment of the present invention.
Figure 11:
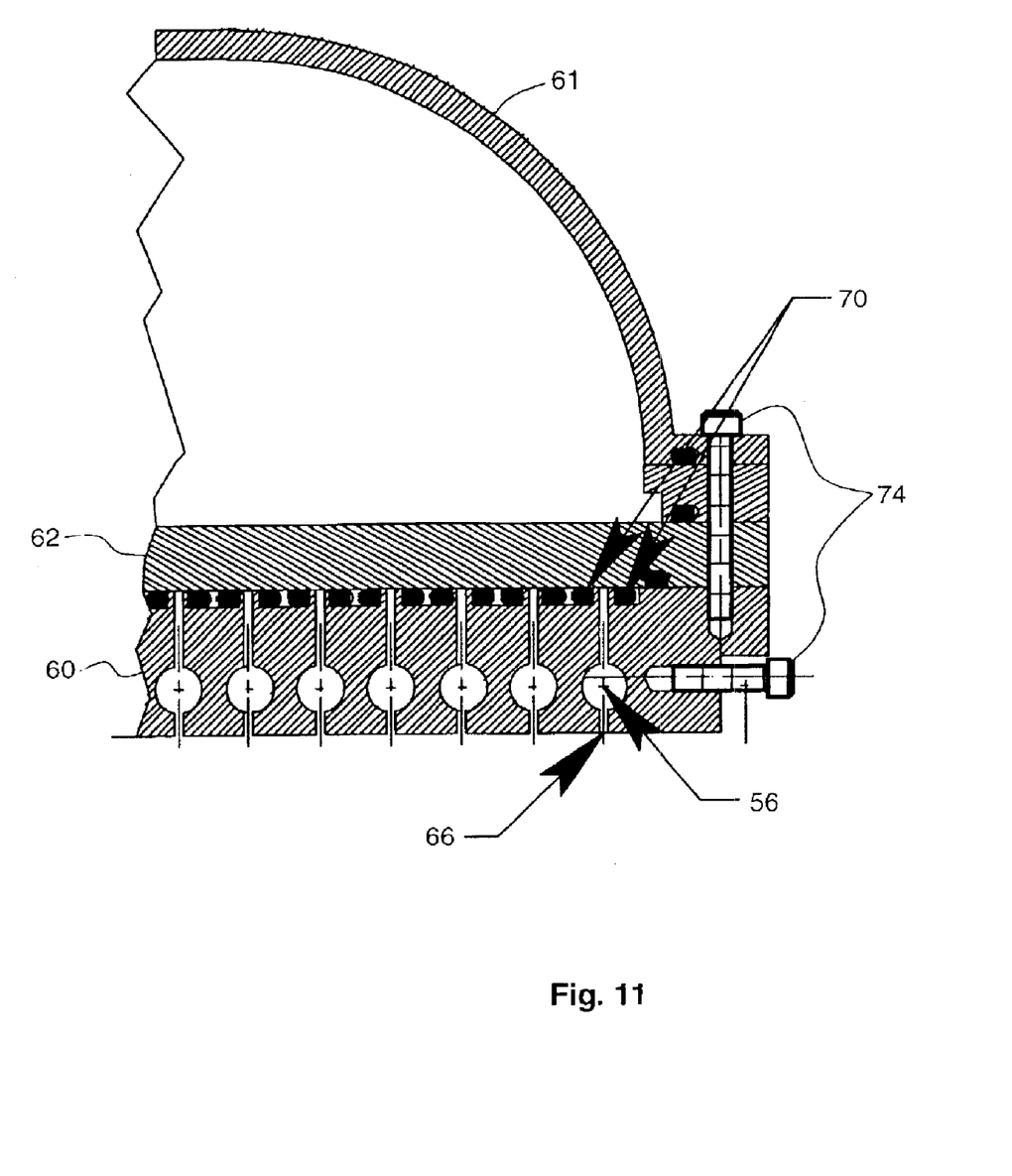
FIG. 11 is a section detail of a multi-jet impingement-cooled slab laser pumphead according to an illustrative embodiment of the present invention.

Reference is directed to FIG. 9, which is a drawing showing the plural inlet jets 66 and plural exhaust orifices 64 as aligned with the laser slab 34 according to an illustrative embodiment of the present invention. FIG. 9 is intended to give a general understanding of the arrangement of the slab 34, the plural inlet jets 66 and the plural exhaust orifices 64 as they align with one another and the manifold housing 61. FIG. 10 is a cross-section of the pumphead taken along section line 'D—D' in FIG. 9. In FIG. 10, the system arrangement is visible. The laser slab 34 is sandwiched between the two coolant manifolds 60, each having their respective inlet manifolds 62 on the side opposite the slab 34. The manifold housing 61 provides a plenum chamber area into which coolant is fed through inlet openings 50. The side coolant outlets 52 are not visible in this section view. In FIG. 11, some details of the manifold assembly are shown. The coolant manifold 60 details the exhaust orifices 66 and the exhaust vents 56. The 'O'-ring 70 seals are positioned between the inlet manifold 62 and the coolant manifold 60. The manifold housing 61 is above, and the assembly is held together with plural bolts 74.

With respect to manufacturing considerations, this embodiment enables the use of a single piece of aluminum as the coolant manifold 60. All holes are drilled from the outside. The exhaust orifices 66, which must necessarily protrude to the outside, are sealed against the inlet manifold 62 by O-rings 70.

Figure 12:
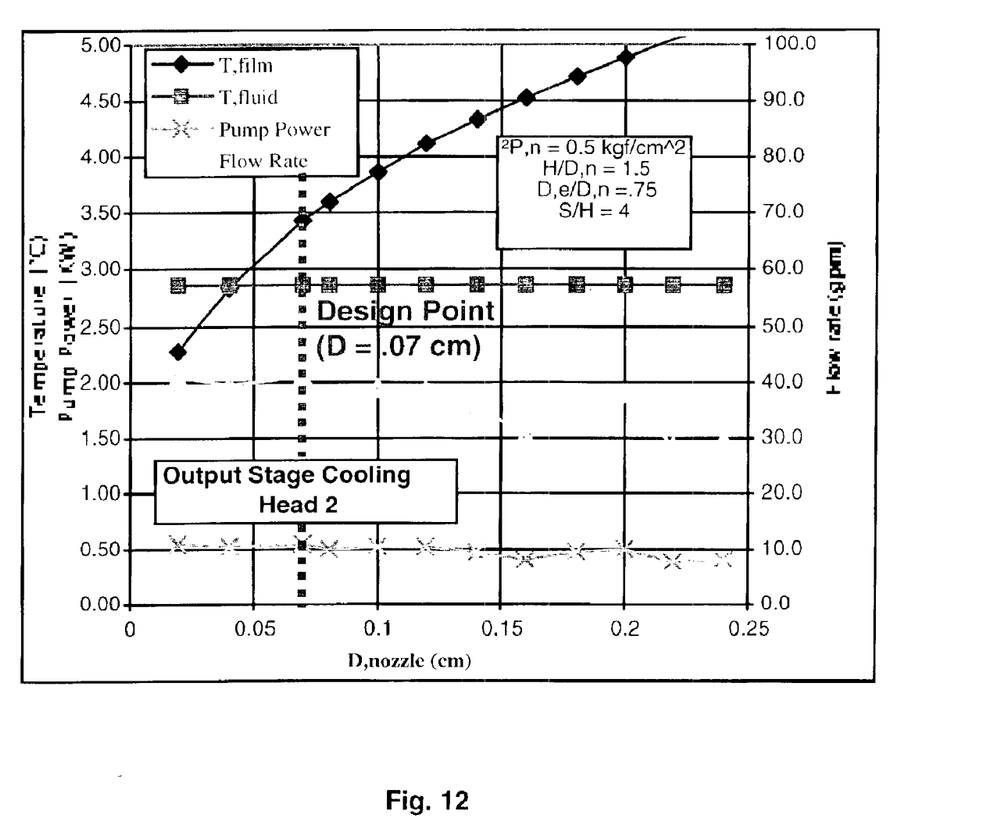
FIG. 12 is a thermal performance plot according to an illustrative embodiment of the present invention.

Reference is now directed to FIG. 12, which is a thermal performance plot developed according to an illustrative embodiment of the present invention. Correlations with existing data have been made and were used for preliminary sizing of the cooling process (see for example Guyer, *Handbook of Applied Thermal Design*, McGraw Hill, N.Y., 1989 and H. Martin, "Heat and Mass Transfer Between Impinging Gas Jets and Solid Surfaces," *Advances in Heat Transfer*, Vol 13, J. P. Hartnett and T. F. Irvine, Jr. (eds), Academic Press, New York, 1977). FIG. 12 shows the preliminary heat transfer tradeoffs wherein temperature rise, flow rate, and pump power are plotted as a function of jet orifice diameter. A diameter of 0.07 cm was selected in the illustrative embodiment, which is small enough to maintain a small film temperature rise (<3.5° C.) yet large enough to be producible.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,
What is claimed is:

1. A system for removing fluorescent energy radiated from a solid state laser medium with a broad surface, comprising:
   a manifold disposed about the laser medium, said manifold having a plurality of inlet jets formed therein and interspersed with a plurality of exhaust orifices formed therein;
   means for circulating a coolant fluid through said plurality of inlet jets to cause said fluid to impinge the broad face of the laser medium, thereby transferring waste energy by convection from the laser medium to said coolant fluid; and
   an absorber disposed within said manifold at a location to intercept said fluorescent energy, and operable to convert said radiated fluorescent energy to sensible heat, and wherein said coolant fluid circulates about said absorber to remove said converted sensible heat from said absorber by forced convection.

2. The system of claim 1 further comprising a heat exchanger coupled into the coolant fluid circulation path for removing waste energy from said coolant fluid.

3. The system of claim 1 wherein said means for circulating fluid operates continuously.

4. The system of claim 1 wherein the laser medium is formed as a slab having at least one edge and wherein pump light enters along said at least one edge and the broad surface defines at least one side of said slab.

5. The system of claim 1 wherein the laser medium is formed with a high aspect ratio defining the broad surface.

6. The system of claim 1 wherein the laser medium is formed with a disk geometry defining the broad surface.

7. The system of claim 1 wherein the laser medium is formed with a substantially rectangular shape defining the broad surface.

8. The system of claim 1 wherein the laser medium is formed with a tapered shape defining the broad surface.

9. The system of claim 1 wherein laser pump light enters the laser medium along a surface other than the broad surface and the waste energy is removed from the broad surface.

10. The system of claim 1 wherein the laser medium is fabricated from Ytterbium doped laser host.

11. The system of claim 1 wherein the laser medium is fabricated from doped Neodymium.

12. The system of claim 1 wherein the laser medium is fabricated from any other solid state doped laser host material such as glass, crystal or ceramic.

13. The system of claim 1 wherein the broad surface is substantially planar.

14. The system of claim 1 wherein the waste energy is sensible heat produce in the laser medium.

15. The system of claim 1 wherein said absorber is an in-band absorber with respect to the lasing wavelength.

16. The system of claim 1 wherein said absorber is bulk particulate matter dispersed in said coolant.

17. The system of claim 1 wherein said absorber is positioned as a layer between plural exhaust orifices and the laser medium, and is selected from one of: a porous material, a sintered metal, a metallic foam, a fibrous material, beads, a woven material, or a mesh.

18. The system of claim 17 wherein said absorber comprises plural layers of material.

19. The system of claim 17 wherein said absorber is positioned at a finite distance from said broad surface and said fluorescent energy is transmitted through said coolant to said absorber.

20. The system of claim 1 wherein said means for circulating fluid is a pump.

21. The system of claim 1 wherein said coolant is selected from one of; ammonia, water, ethanol, methanol, water/ethylene glycol mixture, water/alcohol mixture, and cryogens including liquid $CO_2$, LN2 or liquid argon.

22. The system of claim 1 wherein said manifold has a plurality of exhaust vents formed therein such that plural portions of said plurality exhaust orifices couple said coolant fluid to each of a plurality of exhaust vents prior to said coolant fluid returning to said means for circulating.

23. The system of claim 22 wherein the flow axis of said plural of exhaust orifices and said plural exhaust vents are aligned along substantially different directions.

24. The system of claim 23 wherein said different directions are orthogonal to one another.

25. The system of claim 22 wherein said plural exhaust orifices have a first end opening and a second end opening, said first end opening positioned to receive said coolant near the broad surface of the laser medium and said second end opening sealed from the flow of coolant fluid, said plural orifices having a third opening coupled to one of said plural exhaust vents.

26. The system of claim 25 wherein said second end opening is sealed with an 'O'-ring.

27. A method utilizing a coolant fluid to remove fluorescent energy radiated from a solid state laser medium having a broad surface, the laser medium positioned in a manifold having a plurality of inlet jets interspersed with a plurality of exhaust orifices, the method comprising the steps of:

circulating the coolant fluid into the manifold and through the plurality of inlet jets, thereby impinging the broad face of the laser medium and transferring waste energy by convection;

absorbing the fluorescent energy with an absorber disposed within the manifold at a location to intercept the fluorescent energy;

converting the radiated fluorescent energy to sensible heat by the absorber; and circulating the coolant fluid through the plurality of exhaust orifices, about the absorber and out of the manifold to remove the converted sensible heat from said absorber by forced convection.

28. The method of claim 27 wherein said circulating steps operate continuously.

29. The method of claim 27 wherein the laser medium is formed as a slab having at least one edge, the broad surface defines at least one side of said slab, and the solid state laser is excited with pump light, further comprising the step of:

injecting the pump light into the slab along the edge.

30. The method of claim 27 further comprising the steps of:

injecting pump light along a surface other than the broad surface and removing waste energy from the broad surface.

31. The method of claim 27 wherein the waste energy is sensible heat produced in the laser medium.

32. The method of claim 27 wherein said absorber is an in-band absorber with respect to the lasing wavelength.

33. The method of claim 27 wherein said absorber is bulk particulate matter dispersed in said coolant.

34. The method of claim 27 wherein said absorber is positioned as a layer between said plural exhaust orifices and the laser medium, and is selected from one of a porous material, a sintered metal, a metallic foam, a fibrous material, beads, a woven material, or a mesh.

35. The method of claim 34 wherein said absorber comprises plural layers of material.

36. The method of claim 34 wherein said absorber is positioned at a finite distance from said broad surface, further comprising the step of:

transmitting the fluorescent energy through the coolant to the absorber.

37. A system for removing waste energy form a solid state laser medium with a broad surface, comprising:

a manifold disposed about the laser medium, said manifold having a plurality of inlet jets formed therein and interspersed with a plurality of exhaust orifices formed therein;

means for circulating a coolant fluid through said plurality of inlet jets to cause said fluid to impinge the broad face of the laser medium, thereby transferring waste energy by convection from the laser medium to said coolant fluid; and said manifold further having a plurality of exhaust vents formed therein such that plural portions of said plurality exhaust orifices couple said coolant fluid to each of a plurality of exhaust vent prior to said coolant fluid returning to said means for circulating, wherein said plural exhaust orifices have a first end opening and a second end opening, said first end opening positioned to receive said coolant near the broad surface of the laser medium and said second end opening sealed from the flow of coolant fluid, said plural orifices having a third opening coupled to one of said plural exhaust vents.

38. The system of claim 37 wherein said second end opening is sealed with an 'O'-ring.

* * * * *